United States Patent
Yoshizaki et al.

(10) Patent No.: US 12,255,505 B2
(45) Date of Patent: Mar. 18, 2025

(54) METHOD FOR MANUFACTURING MOTOR CORE

(71) Applicant: JFE STEEL CORPORATION, Tokyo (JP)

(72) Inventors: Souichiro Yoshizaki, Tokyo (JP); Kunihiro Senda, Tokyo (JP); Yoshiaki Zaizen, Tokyo (JP); Yukino Miyamoto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 539 days.

(21) Appl. No.: 17/611,781

(22) PCT Filed: May 15, 2020

(86) PCT No.: PCT/JP2020/019494
§ 371 (c)(1),
(2) Date: Nov. 16, 2021

(87) PCT Pub. No.: WO2020/241315
PCT Pub. Date: Dec. 3, 2020

(65) Prior Publication Data
US 2022/0239202 A1    Jul. 28, 2022

(30) Foreign Application Priority Data
May 28, 2019   (JP) ................. 2019-099169

(51) Int. Cl.
*H02K 15/02*   (2006.01)
*H02K 1/02*    (2006.01)
*H02K 1/04*    (2006.01)

(52) U.S. Cl.
CPC ............. *H02K 15/02* (2013.01); *H02K 1/02* (2013.01); *H02K 1/04* (2013.01); *Y10T 29/49009* (2015.01)

(58) Field of Classification Search
CPC ....... H02K 15/02; H02K 1/02; H02K 2213/03; Y10T 29/49009
(Continued)

(56) References Cited

U.S. PATENT DOCUMENTS 10,008,910 B2 *   6/2018   Jahshan ............... H02P 6/14
11,066,722 B2 *   7/2021   Imamura ............ C22C 38/008
(Continued)

FOREIGN PATENT DOCUMENTS

CN    108884535 A    11/2018
EP      2799579 A1   11/2014
(Continued)

OTHER PUBLICATIONS

A. Belhadj et al. "Effect of Laser Cutting on Microstructure and on Magnetic Properties of Grain Non-Oriented Electrical Steels". Journal of Magnetism and Magnetic Materials, 2003, vol. 256, pp. 20-31.
(Continued)

*Primary Examiner* — Thiem D Phan
(74) *Attorney, Agent, or Firm* — Oliff PLC

(57) ABSTRACT

A method for manufacturing a motor core includes a step of manufacturing a motor core by performing melt-cutting on an electrical steel sheet using heat input from a surface, the electrical steel sheet having an average thermal conductivity in depth positions from the surface to one-third depth of a sheet thickness lower than a thermal conductivity in a middle position in a sheet thickness direction by 30% or greater.

8 Claims, 2 Drawing Sheets

(58) Field of Classification Search
USPC .................................. 29/596, 598, 602.1
See application file for complete search history.

(56) References Cited

U.S. PATENT DOCUMENTS

| | | |
|---|---|---|
| 2017/0136575 A1 | 5/2017 | Hirano et al. |
| 2019/0112697 A1 | 4/2019 | Hiratani et al. |

FOREIGN PATENT DOCUMENTS

| | | | |
|---|---|---|---|
| EP | 3351649 | A1 | 7/2018 |
| EP | 3428293 | A1 | 1/2019 |
| JP | 855-70492 | A | 5/1980 |
| JP | 863-303693 | A | 12/1988 |
| JP | H11-307354 | A | 11/1999 |
| JP | 2000-197318 | A | 7/2000 |
| JP | 2000-328226 | A | 11/2000 |
| JP | 2005-240185 | A | 9/2005 |
| JP | 2009-32753 | A | 2/2009 |
| JP | 2009-164542 | A | 7/2009 |
| JP | 2009-263782 | * | 11/2009 |
| JP | 2009-263782 | A | 11/2009 |
| JP | 2010-063252 | A | 3/2010 |
| JP | 2017-186586 | A | 10/2017 |
| RU | 2092605 | C1 | 10/1997 |
| RU | 2661977 | C1 | 7/2018 |
| WO | 93/08313 | A1 | 4/1993 |

OTHER PUBLICATIONS

Aug. 18, 2020 International Search Report issued in International Patent Application No. PCT/JP2020/019494.
Oct. 30, 2023 Office Action Issued in Korean Patent Application No. 10-2021-7036708.
Jul. 4, 2022 Office Action issued in Russian Patent Application No. 2021137441.
F.R. Ismagilov et al. "On the Selection of Manufacturing Technology for the Stator of Small-Scale and Experimental Electromechanical Energy Converters Taking into Account Magnetic Losses". Electricity, Moscow, NRU "MPEI", 2019, No. 4, pp. 44-50.
Aug. 2, 2022 Search Report issued in European Patent Application No. 20813218.3.
Jun. 24, 2024 Office Action issued in Korean Patent Application No. 10-2021-7036708.
Jul. 7, 2024 Office Action issued in Chinese Patent Application No. 202080037298.7.
Nov. 29, 2024 Office Action issued in Chinese Patent Application No. 202080037298.7.
Li et al., "Design of Permanent Magnet Synchronous Motor and Its Control System", pp. 41-43, Oct. 31, 2017.

\* cited by examiner

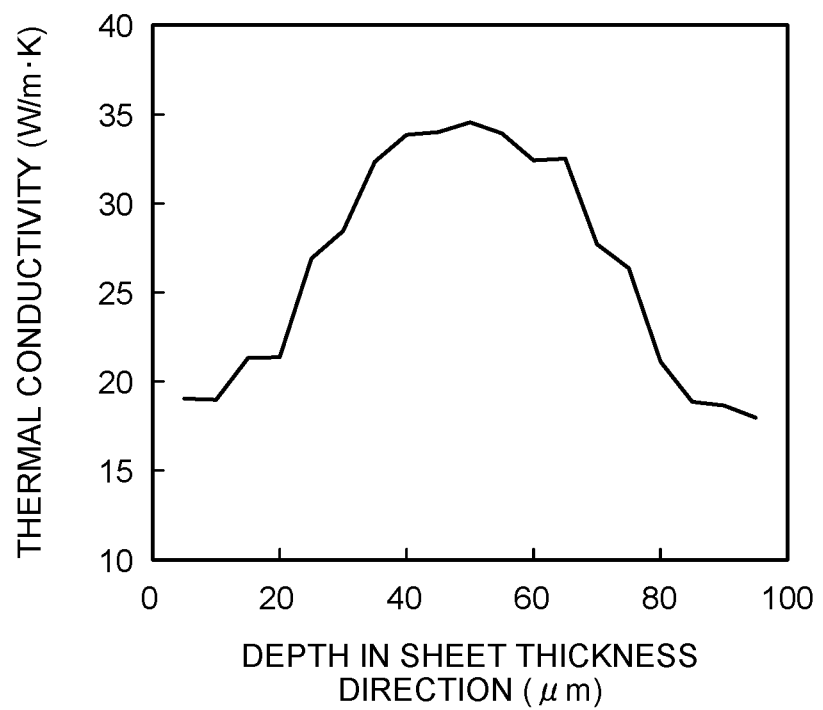

METHOD FOR MANUFACTURING MOTOR CORE

FIELD

The present invention relates to a method for manufacturing a motor core.

BACKGROUND

In recent years, the demand for small motors has been increasing particularly for motors use in the field of aerospace and in cordless vacuum cleaners. In such small motors, there have been advances in increasing speed of motor in order to reduce a size and maintain output. An increase in speed of a motor results in an increase in excitation frequency of a motor core (motor iron core). Furthermore, in order to compensate a loss of motor torque due to size reduction of a motor, the number of poles of a rotor magnet may be increased. The excitation frequency of a motor core is therefore inevitably further increased. An iron core material (core material) of such a high-speed motor is required to have low iron loss characteristics that occur at high frequency. Additions of a large amount of an alloy element, such as Si and Al, to increase a specific resistance, and a reduction in sheet thickness have been taken as effective measures. Additions of a large amount of such an alloy element and a reduction in sheet thickness, however, make punching processing on the motor core difficult. In particular, when aiming for size reduction, a motor core needs to be quite small, therefore, poor processability of an electrical steel sheet, which is a core material, causes problems such as a decrease in the production yield of the punching processing and an increase in the cost. For the above problems, a processing method of a motor core by melt-cutting of an electrical steel sheet using a laser or a similar tool is extensively studied instead of punching processing (refer to Non-Patent Literature 1).

CITATION LIST

Non Patent Literature

Non Patent Literature 1: "Effect of laser cutting on microstructure and on magnetic properties of grain non-oriented electrical steels", Journal of Magnetism and Magnetic Materials 256 (2003) 20-31

SUMMARY

Technical Problem

However, as is commonly known, processing method of a motor core using a laser or a similar tool results in degradation of magnetic properties of the electrical steel sheet, because deformation is introduced to the electrical steel sheet due to heat input and cooling of the electrical steel sheet. Since the degradation of magnetic properties of the electrical steel sheet by deformation introduced to the sheet by a laser or a similar tool is larger in comparison with punching processing. As the method for manufacturing a motor core, a processing method of a motor core using a laser or the like has problems.

In view of the problems described above, it is an object of the present invention to provide a motor core suitable for a small and high-speed rotation motor.

Solution to Problem

A method for manufacturing a motor core according to the present invention includes a step of manufacturing a motor core by performing melt-cutting on an electrical steel sheet using heat input from a surface, the electrical steel sheet having an average thermal conductivity in depth positions from the surface to one-third depth of a sheet thickness lower than a thermal conductivity in a middle position in a sheet thickness direction by 30% or greater.

In the above-described method for manufacturing a motor core according to the present invention, the sheet thickness of the electrical steel sheet is equal to or smaller than 0.20 mm.

In the above-described method for manufacturing a motor core according to the present invention, concentrations of Si, Al, and Mn in the depth positions from the surface to one-third depth of the sheet thickness of the electrical steel sheet satisfy a condition given in a following formula (1).

$$Al + Si \geq 10 Mn \tag{1}$$

In the above-described method for manufacturing a motor core according to the present invention, a concentration of each constituent for an entire sheet thickness of the electrical steel sheet is C: 0.01% or smaller, Si: 7% or smaller, Al: 4% or smaller, and Mn: 5% or smaller, in mass %.

Advantageous Effects of Invention

According to the present invention, a method for manufacturing a motor core that is small and suitable for a high-speed rotation motor can be provided.

BRIEF DESCRIPTION OF DRAWINGS

FIG. 3 is a diagram to illustrate an example relation between the depth in a sheet thickness direction and the thermal conductivity.

DESCRIPTION OF EMBODIMENTS

Figure 1:
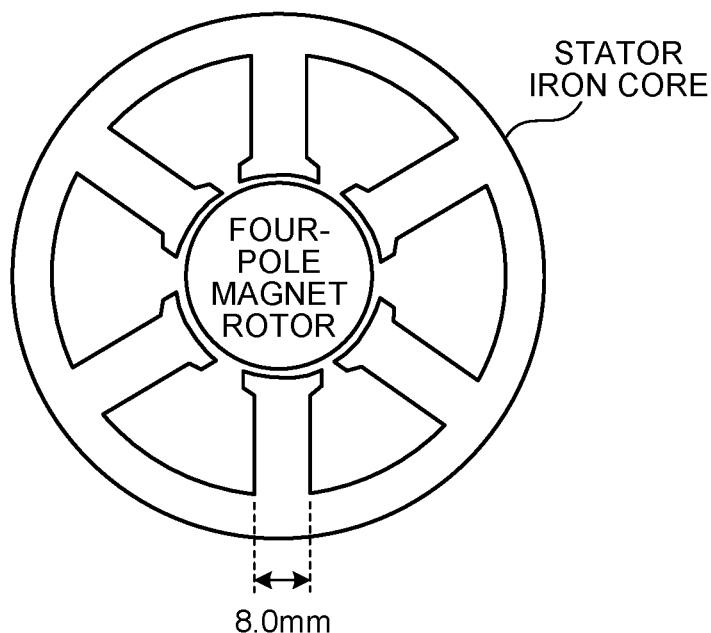
FIG. 1 is a plan view to illustrate the configuration of a motor core of an example.

Inventors of the present invention investigated degradation of magnetic properties of an electrical steel sheet caused by laser processing and the mechanism of degradation, and made deep study and development on electrical steel sheets that could suppress degradation. The study revealed that degradation of magnetic properties of an electrical steel sheet due to laser processing was caused by deformation widely introduced to the electrical steel sheet from the surface of the sheet in a flat surface direction of the electrical steel sheet, the deformation being due to heat input and cooling of the electrical steel sheet introduced by the laser. On the other hand, to perform melt-cutting on the electrical steel sheet before deformation is extended in the flat surface direction, it is desirable that heat input from the surface be easily transmitted to the inside of the electrical steel sheet and hardly transmitted in the flat surface direction. Based on the above knowledge and idea, the inventors of the present invention conducted the following tests and conceived of the present invention.

First, in order to clarify how the conditions of laser processing and the thermal conductivity inside the electrical steel sheet affect the motor efficiency, test motors were fabricated using 0.10 mm thickness electrical steel sheets having the same iron losses at 1.0 T-1000 Hz but having different thermal conductivities in the sheet thickness direction. Evaluation was conducted on the fabricated test motors. Each electrical steel sheet was made of a cold-rolled steel sheet having the Si concentration equivalent to that of the mid layer indicated in the following Table 1, and the Si concentration of the surface layer was increased by siliconizing process. The processing method of the motor cores was punching processing or laser processing.

The tests revealed that, in an electrical steel sheet having such an average thermal conductivity (in Table 1, referred to as a thermal conductivity of the average surface layers) in depth positions from the surface to one-third depth of the sheet thickness lower than the thermal conductivity in the middle position in the sheet thickness direction by 30% or greater, the magnetic properties of the electrical steel sheet were less degraded by laser processing. As a more preferable structure of an electrical steel sheet, the inventors found out that an electrical steel sheet having excellent magnetic properties less likely to be degraded could be obtained when the concentrations of Si, Al, and Mn in the depth positions from the surface to the one-third depth of the sheet thickness satisfied the following formula (1). Based on the findings, the inventors have devised the present invention.

$$Al + Si \geq 10 Mn \qquad (2).$$

As is known, the elements Si, Al, and Mn enhance the magnetic properties of an electrical steel sheet by increasing the specific resistance of the electrical steel sheet and reducing the eddy current losses. However, since Mn increases the coefficient of thermal expansion of an electrical steel sheet, the heat-affected zone of the sheet is expanded at the time of heat input from the surface. Introduction of deformation to the electrical steel sheet is therefore further promoted. Adding an amount of Mn smaller than an amount appropriate for the additive amounts of Si and Al is therefore assumed to further suppress degradation of the magnetic properties of the electrical steel sheet. Although the present invention was devised from studies and practices of laser processing, similar effects can be obtained by melt-cutting processing that uses heat input from the surface, for example, melt-cutting processing that uses electron beams and similar techniques.

A method for manufacturing a motor core according to the present invention will now be described.

The method for manufacturing a motor core according to the present invention performs melt-cutting on an electrical steel sheet using heat input from the surface, the electrical steel sheet having such an average thermal conductivity in the depth positions from the surface to one-third depth of the sheet thickness lower than the thermal conductivity in the middle position in the sheet thickness direction by 30% or greater. This manner of operation facilitates melt-cutting of the electrical steel sheet by allowing heat to pass in the sheet thickness direction while suppressing heat effect in the flat surface direction of the electrical steel sheet, during laser processing. This structure can suppress introduction of deformation to the electrical steel sheet and thus suppress degradation of the magnetic properties of the electrical steel sheet.

Here, the electrical steel sheets formed into a final finished thickness by cold-rolling is heat-treated at 1200° C. under $SiCl_4$, to adjust the amount of Si to be different across the surface layers. This process allowed various average thermal conductivities in the depth positions from the surface to one-third of the depth of the sheet thickness, and various thermal conductivities in the middle position in the sheet thickness direction to be changed. A small motor (a teeth width of 8.0 mm) illustrated in FIG. 1 was made from the above electrical steel sheets, and the motor efficiency was evaluated. The processing method of the motor cores was laser processing or punching processing. In the case of the laser processing, a $CO_2$ pulse laser, a frequency of 1500 Hz—an output of 500 W, was used, oxygen as auxiliary gas was sprayed at 5 MPa, and the speed of laser scanning was set at approximately 5000 mm/min. The motor driving condition, 50 mNm-90000 rpm, was set and Motor Torque Tester EMM-100M manufactured by SUGAWARA Laboratories Inc. was used to measure the output.

Figure 2:
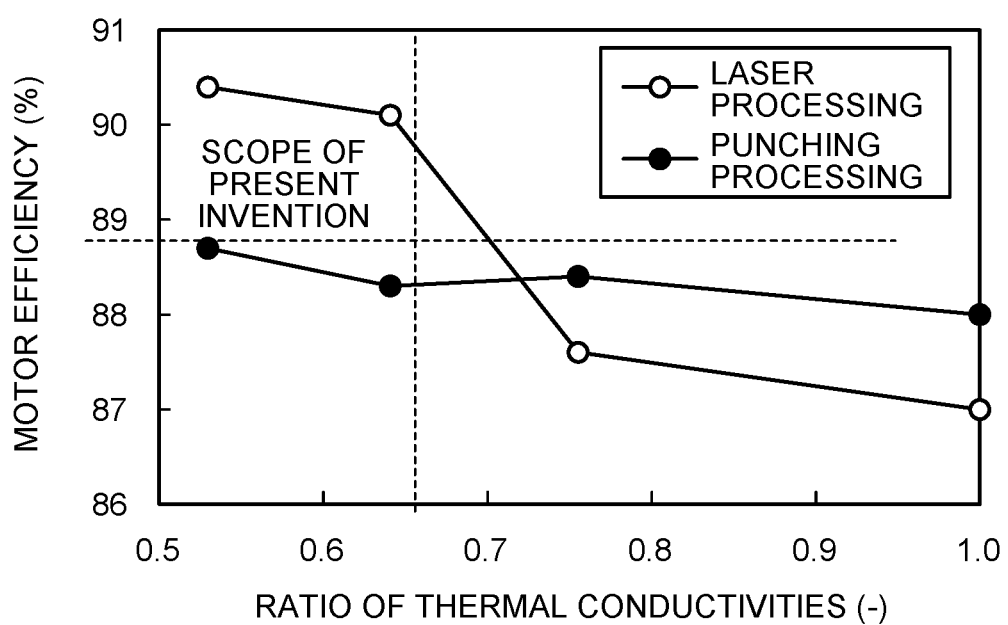
FIG. 2 is a diagram to illustrate a relation between the ratio of thermal conductivities of a motor core manufactured by laser processing and by punching processing and motor efficiency.

Table 1 shows the obtained results, and FIG. 2 illustrates a relation between: the ratio (the ratio of the thermal conductivities) of an average thermal conductivity from the surface to one-third of the depth of the sheet thickness relative to the thermal conductivity at the middle position in the sheet thickness direction; and motor efficiency. As illustrated in FIG. 2, in motor cores fabricated by punching processing, the influence of the ratio of the thermal conductivities on the motor efficiency was not observed. On the other hand, in motor cores fabricated by laser processing, the motor efficiency was markedly improved when the ratio of the thermal conductivities was equal to or smaller than 0.7 (in other words, when the average thermal conductivity in the depth positions from the surface to one-third depth of the sheet thickness was lower than the thermal conductivity in the middle position in the sheet thickness direction by 30% or greater). It is more preferable that the average thermal conductivity in the depth positions from the surface to one-third depth of the sheet thickness be lower than the thermal conductivity in the middle position in the sheet thickness direction by 50% or greater.

TABLE 1

| No. | Si Concentration (mass %) Mid Layer | Si Concentration (mass %) Surface Layer | Iron Loss $W_{10/1000}$ (W/kg) | Thermal Conductivity (W/mK) Average in Surface Layers | Thermal Conductivity (W/mK) Middle | Ratio of Thermal Conductivities | Processing Method | Motor Efficiency (%) | Remarks |
|---|---|---|---|---|---|---|---|---|---|
| 1 | 3.7 | 3.7 | 27.1 | 25.30 | 25.30 | 1.00 | Laser | 87.0 | Comparative Example |
| 2 | 3.0 | 3.9 | 26.8 | 23.60 | 31.25 | 0.76 | Laser | 87.6 | Comparative Example |
| 3 | 2.5 | 4.0 | 27.2 | 22.75 | 35.50 | 0.64 | Laser | 90.1 | Example |
| 4 | 2.0 | 4.2 | 27.1 | 21.05 | 39.75 | 0.53 | Laser | 90.4 | Example |

TABLE 1-continued

| No. | Si Concentration (mass %) Mid Layer | Si Concentration (mass %) Surface Layer | Iron Loss $W_{10/1000}$ (W/kg) | Thermal Conductivity (W/mK) Average in Surface Layers | Thermal Conductivity (W/mK) Middle | Ratio of Thermal Conductivities | Processing Method | Motor Efficiency (%) | Remarks |
|---|---|---|---|---|---|---|---|---|---|
| 5 | 3.7 | 3.7 | 27.1 | 25.30 | 25.30 | 1.00 | Punching | 88.0 | Comparative Example |
| 6 | 3.0 | 3.9 | 26.8 | 23.60 | 31.25 | 0.76 | Punching | 88.4 | Comparative Example |
| 7 | 2.5 | 4.0 | 27.2 | 22.75 | 35.50 | 0.64 | Punching | 88.3 | Comparative Example |
| 8 | 2.0 | 4.2 | 27.1 | 21.05 | 39.75 | 0.53 | Punching | 88.7 | Comparative Example |

The method to apply a change in the thermal conductivity in the sheet thickness direction to the electrical steel sheet is non-limiting. For example, as described later in the examples, siliconizing technique, which provides chemical vapor deposition (CVD) processing to the electrical steel sheet, and a manufacturing technique of clad steel, in which electrical steel sheets having different constituents are joined, can be used. The thermal conductivity in the sheet thickness direction may be evaluated using, for example, a thermal microscope (Thermal Microscope TM3 manufactured by Bethel Co., Ltd.). Although absolute values of the thermal conductivities of the electrical steel sheet are not related to the effects of the present invention, an average thermal conductivity for the entire thickness of the sheet is preferably equal to or greater than 10 W/mK, and more preferably, equal to or greater than 15 W/mK, in order to process the electrical steel sheet using heat input of a laser.

Since a high-speed rotation motor is required to have low iron loss characteristics at high frequency, the electrical steel sheet needs to have a thickness effective for a reduction in eddy current, which is, preferably, equal to or smaller than 0.20 mm, and more preferably, equal to or smaller than 0.15 mm, and further preferably, equal to or smaller than 0.10 mm.

Adding an element that increases the specific resistance of the electrical steel sheet is effective to reduce iron losses at high frequency. Exceeding addition of Mn, however, increases the coefficient of thermal expansion and promotes introduction of deformation to the electrical steel sheet during laser processing, which may degrade the magnetic properties of the electrical steel sheet. Therefore, the concentrations of Si, Al, and Mn in the depth positions from the surface to the one-third depth of the sheet thickness should satisfy the following formula (1), and moreover, it is preferable that the additive amount of Mn be equal to or smaller than a certain amount defined relative to the additive amounts of Al and Si.

$$Al+Si \geq 10Mn \quad (3).$$

In the presence of an excessive amount of C (carbon), the magnetic properties of the electrical steel sheet are degraded due to aging of magnetism. The concentration of carbon for the entire sheet thickness of the electrical steel sheet is preferably 0.01% or smaller, and more preferably, 0.001% or smaller, in mass %. Addition of Si, Al, and Mn increases the specific resistance of the electrical steel sheet and thus contributes to a reduction in eddy current losses. Addition of these elements is therefore effective, on the other hand, adding an excessive amount results in the saturation magnetic flux density of the electrical steel sheet. It is therefore preferable that the concentration (average concentration) of the entire sheet thickness of the electrical steel sheet be Si: 7% or smaller, Al: 4% or smaller, and Mn: 5% or smaller, in mass %.

Degradation of the magnetic properties of the electrical steel sheet due to deformation introduced during the processing can be obvious when the teeth width is equal to or smaller than 10 mm. It is therefore preferable that the method for manufacturing a motor core of the present invention be adopted to motors having a teeth width of equal to or smaller than 10 mm.

The electrical steel sheet according to the present invention has a small degradation in magnetic properties due to deformation introduced by heat input from the surface. A motor core having excellent magnetic properties thus can be manufactured by processing the electrical steel sheet using heat input from a laser, electron beams, and a similar technique, in comparison to processing by cutting. There are no limits on the conditions of laser processing (for example, the output and the conditions of gas) or the conditions of processing using electron beams (for example, the acceleration voltage, the current, and the atmosphere at the time of irradiation), which may be adjusted depending on the sheet thickness of an iron core material, the required speed of processing, and other factors. In the present invention, an electrical steel sheet having a thickness of smaller than 0.20 mm is assumed to be processed as the target object. Use of an unnecessarily high-power laser promotes further introduction of deformation by heat and is therefore not desirable in the aspect of magnetic properties. The laser output is therefore preferably lower than 500 W, more preferably, lower than 250 W. From the same viewpoint, the diameter of a laser is preferably smaller. Specifically, a single-mode fiber laser, or a similar tool, having a diameter smaller than 50 μm is preferably used.

The necessity of an insulation film to the electrical steel sheet to be used is the same as that of usual electrical steel sheet. It is preferable that an insulation film originally having sufficient insulation be formed on one of the surfaces or both surfaces of the electrical steel sheet. Furthermore, the present invention assumes the usage in which an annealing process for removing deformation after formation of the core, which increases not only the manufacturing cost but also the investment cost in facility, is not performed. For formation of the core, the electrical steel sheets may be laminated and fixed to one another by caulking, adhering, and other manners. The manners of lamination are not limited.

The magnetic properties of an electrical steel sheet to be used is effectively improved by adding the following elements to the electrical steel sheet within the given ranges. The elements Sn, P, and Sb are added in the range equal to or smaller than 0.1% as necessary, preferably, equal to or greater than 0.001%. This is because the magnetic flux density of the iron core is improved by improving the texture. When the additive amount exceeds 0.1%, the advantageous effect reaches a plateau with the cost unnecessarily increased. The upper limit of the additive amount is therefore set at 0.1%.

There is no limit to the method for manufacturing an electrical steel sheet to be used, and various methods are applicable as long as the manufactured electrical steel sheet satisfies the above conditions. The following manufacturing methods (1) to (3) can be given as examples.

(1) Material having different constituents are each blown in a converter. The obtained molten steel is degassed and adjusted to have predetermined constituents, and then cast into a slab. After the surface is cleaned, the obtained slabs are laminated and welded using electron beams or a similar method. At a subsequent stage, the laminated slabs are hot-rolled, and then cold or warm-rolled once, or cold or warm-rolled twice or more with an intermediate annealing process interposed, using a usual method, and is formed into a sheet having a predetermined thickness. The sheet then undergoes finishing annealing.

(2) A material having certain constituents is blown in a converter. The obtained molten steel is degassed and adjusted to have predetermined constituents. A slab is hot-rolled, and then cold or warm-rolled once, or cold or warm-rolled twice or more with an intermediate annealing process interposed, using a usual method, and is formed into a sheet having a predetermined thickness. An element such as Si is supplied to the surface of the electrical steel sheet by the CVD method or the like, whereby a distribution of thermal conductivities in the sheet thickness direction is formed.

(3) A material having certain constituents is blown in a converter. The obtained molten steel is degassed and adjusted to have predetermined constituents. A slab is hot-rolled, and then cold or warm-rolled once, or cold or warm-rolled twice or more with an intermediate annealing process interposed, using a usual method, and is formed into a sheet having a predetermined thickness. Aluminum foil is laminated on the formed electrical steel sheet. The electrical steel sheet then undergoes finishing annealing in a non-oxidizing atmosphere.

Example 1

Electrical steel sheets, as a material of a motor core, having the constituents in Table 2 in the sheet thickness direction were fabricated by the methods illustrated in Table 2. On each of the electrical steel sheets, evaluation of the thermal conductivity in the sheet thickness direction, and evaluation of the iron losses ($W_{10/1000}$) using the Epstein frame method defined in JIS C2550-1 were conducted. As an example, FIG. 3 illustrates results of the thermal conductivity in the sheet thickness direction of an electrical steel sheet of the No. 1. Furthermore, small motors illustrated in FIG. 1 were fabricated from respective electrical steel sheets, and motor efficiency was evaluated on each motor. The motor driving condition, 50 mNm-90000 rpm, was set and Motor Torque Tester EMM-100M manufactured by SUGAWARA Laboratories Inc. was used to measure the output. The numbers in the column of the method for manufacturing electrical steel sheets in Table 2 correspond to the above-described manufacturing methods (1) to (3). Conditions of intermediate processes of the manufacturing are described as below. The conditions were adjusted such that the surface layers (front and back) and the mid layer each consist of different constituents, and that each of the layers constitute one-third of the sheet.

(1) A material was blown and degassed in a converter, and adjusted to have predetermined constituents. The material was then cast and had the surface cleaned. The obtained slabs having different constituents were laminated and reheated to 1200° C. After hot rolling, a sheet having a sheet thickness of 1.8 mm was obtained. The sheet was conveyed to cold rolling to have a final finished thickness, and subsequently underwent annealing at 1000° C. under dry $N_2$ atmosphere.

(2) A material was blown in a converter, and degassed and adjusted to have predetermined constituents, and then cast. The obtained slab was reheated to 1200° C. After hot rolling, a sheet having a sheet thickness of 1.8 mm was obtained. The sheet was conveyed to cold rolling to have a final finished thickness, and subsequently underwent heat-treated at 1200° C. under $SiCl_4$, to adjust the amount of Si in the surface layers.

(3) A material was blown in a converter, and degassed and adjusted to have predetermined constituents. The material was then cast and had the surface cleaned. The obtained slab was reheated to 1200° C. After hot rolling, a sheet having a sheet thickness of 1.8 mm was obtained. The sheet was conveyed to cold rolling to have a final finished thickness, and subsequently, 10 µm aluminum foil was laminated on both surfaces of the electrical steel sheet. The laminated electrical steel sheet was restrained and subjected to annealing at 900° C.×5 h under $N_2$ atmosphere.

The processing method of the motor cores was laser processing or punching processing. In the case of the laser processing, the $CO_2$ pulse laser, a frequency of 1500 Hz—an output of 500 W, was used, oxygen as auxiliary gas was sprayed at 5 MPa, and the speed of laser scanning was set at approximately 5000 mm/min.

Results of evaluation are illustrated in Table 2, which is described below. As illustrated in Table 2, the results reveal that high-efficiency motor characteristics can be obtained with a material in which the surface layer of an electrical steel sheet has a thermal conductivity lower than that in the middle by 30% or greater. On the other hand, a material in which the thermal conductivity of the surface layer was not lower than that in the middle by 30% or greater exhibited superior iron loss values in the Epstein frame method but inferior motor efficiency. In comparison of the No. 1 and No. 2, although the electrical steel sheets for them were made of the same materials, the No. 2, in which the processing method of the iron core was punching processing, had lower motor efficiency. This result is considered to have occurred because the electrical steel sheet of the present invention has the magnetic properties less likely to be degraded when processed by a laser processing compared to by punching processing. Furthermore, under the condition in which the constituents of the surface layer satisfied the above formula (1), the motor formed by laser processing had a tendency to improve its efficiency. This result is considered to have occurred because the increase of the coefficient of thermal expansion due to the presence of Mn in the surface layer is suppressed and thus introduction of deformation to the electrical steel sheet at the time of heat input is further reduced.

TABLE 2

| No. | Surface Layer Si (mass %) | Surface Layer Al (mass %) | Surface Layer Mn (mass %) | Mid Layer Si (mass %) | Mid Layer Al (mass %) | Mid Layer Mn (mass %) | Average Si (mass %) | Average Al (mass %) | Average Mn (mass %) | Others (mass %) |
|---|---|---|---|---|---|---|---|---|---|---|
| 1 | 5.0 | 0.5 | 0.1 | 3.0 | 0.5 | 0.5 | 4.33 | 0.50 | 0.23 | Sn: 0.01 |
| 2 | 5.0 | 0.5 | 0.1 | 3.0 | 0.5 | 0.5 | 4.33 | 0.50 | 0.23 | Sn: 0.01 |
| 3 | 5.0 | 0.5 | 0.1 | 3.0 | 0.5 | 0.5 | 4.33 | 0.50 | 0.23 | — |
| 4 | 5.0 | 1.7 | 1.0 | 3.0 | 0.5 | 0.5 | 4.33 | 1.30 | 0.83 | |
| 5 | 6.5 | 0.1 | 0.01 | 3.3 | 0.5 | 0.1 | 5.43 | 0.23 | 0.04 | P: 0.01 |
| 6 | 6.5 | 0.1 | 0.01 | 3.3 | 0.5 | 0.1 | 5.43 | 0.23 | 0.04 | |
| 7 | 3.0 | 4.2 | 0.6 | 3.0 | 0.5 | 0.4 | 3.00 | 2.97 | 0.53 | Sb: 0.01 |
| 8 | 3.0 | 4.2 | 0.8 | 3.0 | 0.5 | 0.8 | 3.00 | 2.97 | 0.80 | — |
| 9 | 4.5 | 0.1 | 0.1 | 3.5 | 0.5 | 0.5 | 4.17 | 0.23 | 0.23 | Sb: 0.02 |
| 10 | 5.5 | 1.0 | 0.1 | 2.5 | 0.5 | 1.0 | 4.50 | 0.83 | 0.40 | — |

| No. | Sheet Thickness | Method for manufacuri | Thermal Conductivity (W/mK) Average in Surface Layers | Thermal Conductivity (W/mK) Middle | Ratio of Thermal Conductivities | Iron Loss $W_{10/1000}$ (W/kg) | Processing Method of Core | Motor Efficiency (%) | Remarks |
|---|---|---|---|---|---|---|---|---|---|
| 1 | 0.10 | (2) | 19.1 | 30 | 0.64 | 24.6 | Laser | 91.8 | Example |
| 2 | 0.10 | (2) | 19.1 | 30 | 0.64 | 24.6 | Punching | 89.1 | Comparative Example |
| 3 | 0.10 | (1) | 19.5 | 30 | 0.65 | 28.6 | Laser | 90.8 | Example |
| 4 | 0.20 | (1) | 17.0 | 30 | 0.57 | 38.6 | Laser | 87.2 | Example |
| 5 | 0.10 | (2) | 16.3 | 32 | 0.51 | 21.6 | Laser | 92.3 | Example |
| 6 | 0.15 | (2) | 16.3 | 32 | 0.51 | 32.4 | Laser | 89.6 | Example |
| 7 | 0.10 | (3) | 17.0 | 30 | 0.57 | 27.6 | Laser | 90.6 | Example |
| 8 | 0.10 | (3) | 18.0 | 31 | 0.58 | 27.6 | Laser | 89.5 | Example |
| 9 | 0.08 | (2) | 23.0 | 27 | 0.85 | 24.9 | Laser | 88.0 | Comparative Example |
| 10 | 0.01 | (1) | 16.4 | 33 | 0.50 | 25.6 | Laser | 91.3 | Example |

Second Example

A material of the No. 5 illustrated in Table 2 was evaluated how the conditions of a laser used for processing affected the results. The method of evaluation was the same as the first example except laser conditions. The evaluation results of motors in relation to the laser conditions are illustrated in Table 3. As illustrated in Table 3, the condition for irradiation with a $CO_2$ laser of the continuous oscillation, the motor efficiency was inferior to that of a $CO_2$ laser of the pulse oscillation having the same level of output. In addition to this, the condition for processing with the $CO_2$ laser of the pulse oscillation at a low output of 250 W, the motor efficiency was superior to those of in the other conditions. Furthermore, it was observed that use of a fiber laser, as a source of oscillation, instead of the $CO_2$ laser further improved the motor efficiency.

TABLE 3

| No. | Laser Source | Output (W) | Oscillation | Motor Efficiency (%) | Remarks |
|---|---|---|---|---|---|
| 1 | $CO_2$ | 500 | Continuous | 89.1 | Example |
| 2 | $CO_2$ | 500 | Pulse | 92.5 | Example |
| 3 | $CO_2$ | 250 | Pulse | 92.8 | Example |
| 4 | Fiber Laser | 500 | Continuous | 92.6 | Example |
| 5 | Fiber Laser | 500 | Pulse | 92.9 | Example |
| 6 | Fiber Laser | 250 | Pulse | 93.3 | Example |

INDUSTRIAL APPLICABILITY

According to the present invention, a method for manufacturing a motor core that is small and suitable for a high-speed rotation motor can be provided.

The invention claimed is:

1. A method for manufacturing a motor core, comprising:
   a step of manufacturing a motor core by performing melt-cutting on an electrical steel sheet using heat input from a surface, the electrical steel sheet having an average thermal conductivity in depth positions from the surface to one-third depth of a sheet thickness lower than a thermal conductivity in a middle position in a sheet thickness direction by 30% or greater.

2. The method for manufacturing a motor core according to claim 1, wherein the sheet thickness of the electrical steel sheet is equal to or smaller than 0.20 mm.

3. The method for manufacturing a motor core according to claim 2, wherein concentrations of Si, Al, and Mn in the depth positions from the surface to one-third depth of the sheet thickness of the electrical steel sheet satisfy a condition given in a following formula (1):

$$Al+Si \geq 10Mn \quad (1).$$

4. The method for manufacturing a motor core according to claim 3, wherein a concentration of each constituent for an entire sheet thickness of the electrical steel sheet is C: 0.01% or smaller, Si: 7% or smaller, Al: 4% or smaller, and Mn: 5% or smaller, in mass %.

5. The method for manufacturing a motor core according to claim 2, wherein a concentration of each constituent for an entire sheet thickness of the electrical steel sheet is C: 0.01% or smaller, Si: 7% or smaller, Al: 4% or smaller, and Mn: 5% or smaller, in mass %.

6. The method for manufacturing a motor core according to claim 1, wherein concentrations of Si, Al, and Mn in the depth positions from the surface to one-third depth of the sheet thickness of the electrical steel sheet satisfy a condition given in a following formula (1):

$$Al+Si \geq 10Mn \quad (1).$$

7. The method for manufacturing a motor core according to claim 6, wherein a concentration of each constituent for an entire sheet thickness of the electrical steel sheet is C: 0.01% or smaller, Si: 7% or smaller, Al: 4% or smaller, and Mn: 5% or smaller, in mass %.

8. The method for manufacturing a motor core according to claim 1, wherein a concentration of each constituent for an entire sheet thickness of the electrical steel sheet is C: 0.01% or smaller, Si: 7% or smaller, Al: 4% or smaller, and Mn: 5% or smaller, in mass %.

* * * * *